United States Patent
Liu

(10) Patent No.: US 6,976,354 B2
(45) Date of Patent: Dec. 20, 2005

(54) REDUCING OXIDES OF NITROGEN USING REFORMATE GENERATED FROM ENGINE FUEL, WATER AND/OR AIR

(75) Inventor: Ke Liu, East Longmeadow, MA (US)

(73) Assignee: HydrogenSource LLC, South Windsor, CT (US)

( * ) Notice: Subject to any disclaimer, the term of this patent is extended or adjusted under 35 U.S.C. 154(b) by 0 days.

(21) Appl. No.: 10/789,512

(22) Filed: Feb. 26, 2004

(65) Prior Publication Data

US 2004/0163377 A1   Aug. 26, 2004

Related U.S. Application Data

(63) Continuation of application No. 10/243,105, filed on Sep. 13, 2002, now abandoned, which is a continuation-in-part of application No. 10/166,860, filed on Jun. 11, 2002, now abandoned.

(51) Int. Cl.$^7$ ............................................. F01N 3/00
(52) U.S. Cl. ................... 60/275; 60/274; 60/286; 60/287; 60/295; 60/297; 60/301; 423/650; 423/652
(58) Field of Search ................. 60/274, 275, 286, 60/287, 288, 295, 297, 301, 303; 123/1 A, 123/3, DIG. 12; 423/650, 651, 652

(56) References Cited

U.S. PATENT DOCUMENTS

| | | | |
|---|---|---|---|
| 5,425,332 A | 6/1995 | Rabinovich et al. | |
| 5,437,250 A | 8/1995 | Rabinovich et al. | |
| 5,887,554 A | 3/1999 | Cohn et al. | |
| 6,363,716 B1 * | 4/2002 | Balko et al. | 60/286 |
| 6,560,958 B1 | 5/2003 | Bromberg et al. | |
| 6,758,035 B2 * | 7/2004 | Smaling | 60/285 |
| 6,810,658 B2 * | 11/2004 | Kaupert et al. | 60/274 |
| 6,832,473 B2 * | 12/2004 | Kupe et al. | 60/286 |
| 6,845,610 B2 * | 1/2005 | Shiino et al. | 60/286 |

* cited by examiner

Primary Examiner—Tu M. Nguyen
(74) Attorney, Agent, or Firm—M. P. Williams

(57) ABSTRACT

Inlet air (15) humidified in an air bubbling (or other) humidifier (35) that receives water from a tank (36) is sent to a hydrogen generator (27) along with vaporized (23) diesel fuel (22) to produce hydrogen and carbon monoxide (28) for either (a) mixing with the mainstream of exhaust (18) fed to a catalytic converter (30) or (b) regenerating a pair of NOx adsorption traps (38, 39), thereby reducing oxides of nitrogen (NOx), to provide system exhaust (32) which may have less than 0.40 grams/bhp/hr of NOx and 0.28 grams/bhp/hr of non-methane hydrocarbons. In other embodiments, unhumidified air mixed with fuel feeds a homogeneous non-catalytic partial oxidizer (27) to provide the required hydrogen and carbon monoxide.

15 Claims, 4 Drawing Sheets

REDUCING OXIDES OF NITROGEN USING REFORMATE GENERATED FROM ENGINE FUEL, WATER AND/OR AIR

CROSS REFERENCE TO RELATED APPLICATION

This is a continuation of U.S. patent application Ser. No. 10/243,105, filed on Sep. 13, 2002 now abandoned, which is a continuation-in-part of U.S. patent application Ser. No. 10/166,860 filed on Jun. 11, 2002 now abandoned.

TECHNICAL FIELD

This invention relates to reducing oxides of nitrogen (NOx) in the exhaust of hydrocarbon-fueled, internal combustion engines (such as gasoline or diesel engines), and more particularly to using hydrogen generators, such as catalytic partial oxidizers (CPOx), non-catalytic (homogeneous) partial oxidizers (POx), or auto thermal reformers (ATR), to generate from engine fuel, water and/or air, streams including hydrogen and carbon monoxide for reducing NOx in catalytic converters or regenerating NOx trap adsorbents.

BACKGROUND ART

The Environmental Protection Agency (EPA) has set, for 2007 and beyond, vehicle internal combustion engine emission requirements; one exemplary requirement for diesel engines, is NOx and non-methane hydrocarbons below 0.20 grams bhp-hr and 0.14 grams/bhp-hr, respectively. This contrasts with current standards of 4.0 grams/bhp-hr and 1.3 grams/bhp-hr, respectively. Thus, the catalytic converters must accomplish a significant reduction in NOx. There currently are no catalyst formulations which are able to adequately reach these restrictive standards; significant development will be required to reduce the cost and improve performance of new catalyst formulations. Apparatus that oxidizes engine fuel to provide a mix that enhances NOx reduction is disclosed in U.S. Pat. No. 5,412,946, in PCT published application WO 01/34950, and U.S. patent application Publication 2001/41153.

One known methodology for NOx reduction is the so-called SCR (Selective Catalytic Reduction) process, as shown in FIG. 1. Therein, a hydrocarbon-fueled engine 10 receives fuel from a tank 12 provided by a fuel pump 13, as well as air from a turbo compressor 14 in an air inlet line 15. An aqueous solution of urea is carried in a tank 16. The urea solution is applied to a hydrolysis unit 17 together with engine exhaust in a pipe 18, wherein heat of the exhaust converts the urea solution to gaseous ammonia. The ammonia then reacts in a selective catalytic converter 19 with NOx in the exhaust gas to convert the NOx to nitrogen and water, providing reduced NOx in the system exhaust 20. The problem is that there is no infrastructure in place to provide the urea solution at stations where fuel, particularly diesel fuel and gasoline, is obtained.

In commonly owned copending U.S. patent application Ser. No. 10/159,369 filed May 31, 2002, hydrogen for reducing NOx in catalytic converters or regenerating NOx trap adsorbents is generated utilizing moisture derived either directly or indirectly from engine exhaust. All of the aforementioned NOx reduction techniques are complicated and expensive.

DISCLOSURE OF INVENTION

Objects of the present invention include: improvement in the reduction of NOx to nitrogen and other harmless gases; achieving NOx reduction that meets EPA 2007 NOx emission requirements; simple, low-cost hydrogen generation for NOx reduction; and generation of hydrogen in and for an internal combustion engine exhaust emission reduction system, from only fuel already available with the engine in addition to water and/or air.

According to the present invention, fuel from the fuel tank of a hydrocarbon-fueled, internal combustion engine and air from the engine air inlet are processed either (a) in a homogeneous non-catalytic partial oxidizer, or (b) along with stored water and heat in the engine's exhaust in a hydrogen generator, which may be a catalytic partial oxidizer, a homogeneous non-catalytic partial oxidizer, or an auto thermal reformer, to generate a stream of reformate, including hydrogen and carbon monoxide, which is used, either directly or following the reaction of NOx with other compounds, to eliminate NOx in the exhaust. For example, the hydrogen-rich stream may either (a) be mixed with the main exhaust stream for processing in a NOx-reducing catalytic converter, or (b) used to regenerate adsorbent in NOx traps following the formation of nitrogen-containing compounds by reaction of NOx in the exhaust with adsorbent in the NOx traps. When unhumidified air (no water) is combined with fuel, a homogeneous, non-catalytic partial oxidizer is used.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 1:
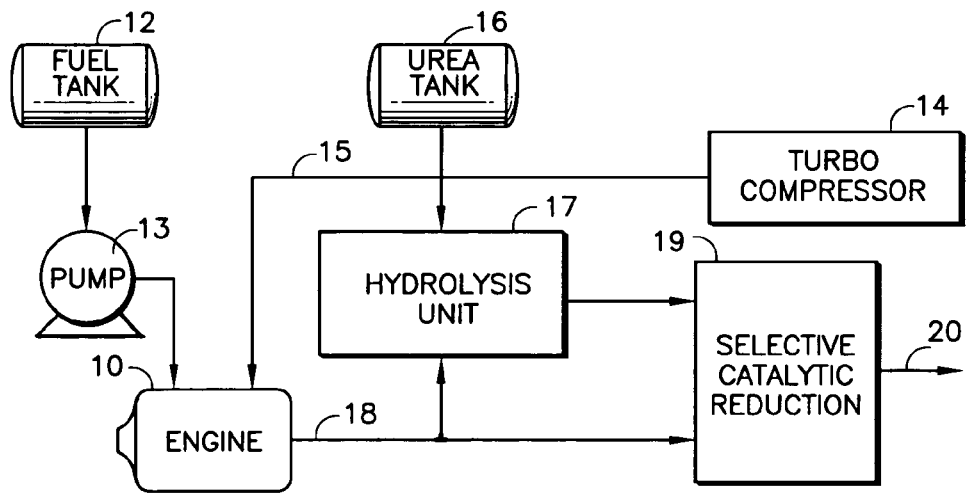
FIG. 1 is a simplified, stylized schematic illustration of NOx reduction using ammonia decomposed from urea solution, known to the art.
Figure 2:
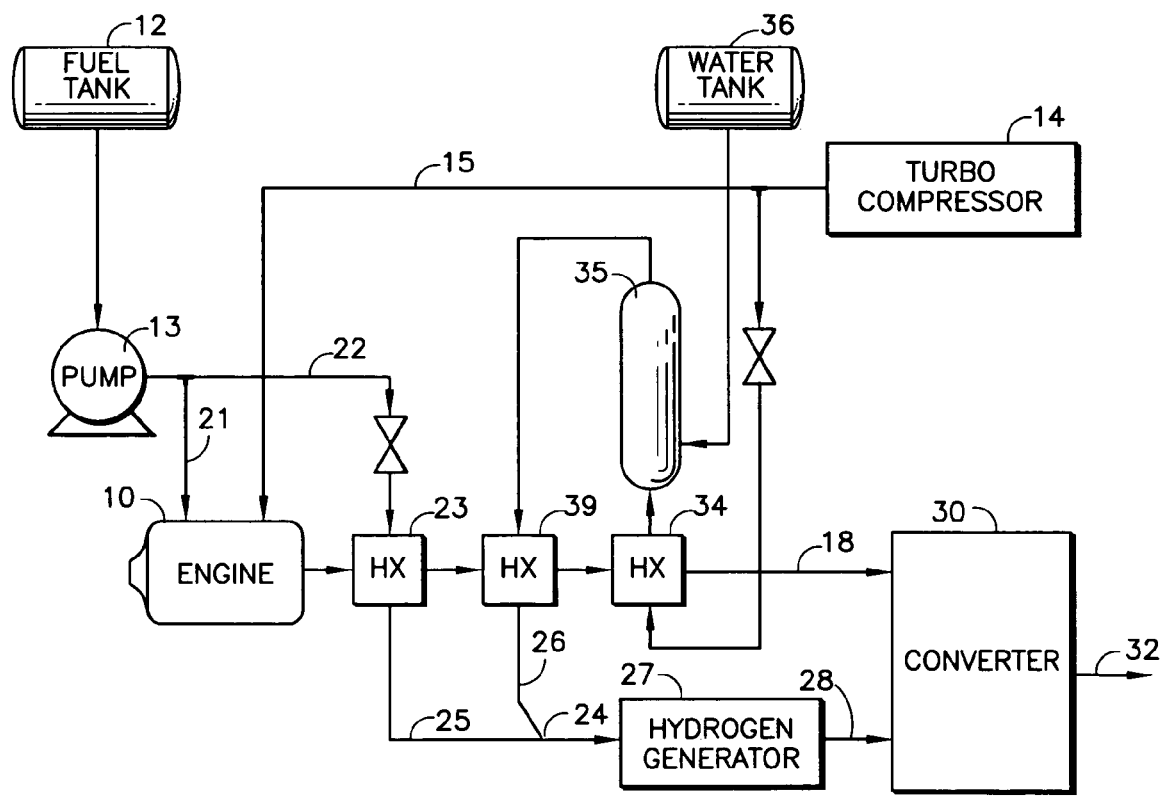
FIG. 2 is a simplified, stylized schematic illustration of an engine incorporating a first humidifying embodiment of the present invention.

In FIG. 2, the engine 10 has the conventional turbo compressor 14 feeding the air inlet line 15, a hydrocarbon fuel tank 12, and a fuel pump 13. The fuel may typically be diesel fuel, gasoline, natural gas, liquid petroleum gas, or propane. The fuel is fed by a line 21 to the engine for combustion with the air, and is fed by a second line 22 through a vaporizing heat exchanger 23 to a mixer 24 in a line 25 that feeds humidified air in a line 26 to a hydrogen generator 27. The hydrogen generator 27 may be a catalytic partial oxidizer (CPOx), a non-catalytic (homogeneous) partial oxidizer (POx), or an auto thermal reformer (ATR). Within the hydrogen generator, if it is a CPOx, foam monolith or other form of catalyst, which may comprise a group VIII metal, preferably nickel, cobalt, rhodium, iridium or platinum, convert fuel along with hydrocarbons, water and oxygen into a mix of hydrogen, CO and $CO_2$. This is provided through a conduit 28 to an NOx reducing catalytic converter 30 along with exhaust in the pipe 18, the output of which is exhausted by a pipe 32, typically to ambient. The converter 30 is of the type commonly used in diesel engines, except the catalyst therein may be different. In the converter 30, the exhaust—hydrogen, oxides of nitrogen and carbon monoxide—is converted to mainly nitrogen, water, and carbon dioxide, with traces of non-methane hydrocarbons and oxides of nitrogen. With proper adjustment for the particular engine and desired performance range (utilizing valves and possibly a controller responding to sensors, all known in the art), the invention will permit reducing the NOx to 0.40 grams/bhp/hr and non-methane hydrocarbons to 0.28 grams/bhp/hr.

Air from the air inlet 15 is heated in a heat exchanger 34 and then fed to a suitable humidifier, such as an air bubbler 35, which receives ordinary water from a tank 36. The humidified air may be heated further in a heat exchanger 39 before passing through the line 26 and mixer 24 to the hydrogen generator 27.

In FIG. 2, the NOx is treated continuously in a known converter. In accordance with the invention, a more effective elimination of NOx comprises utilizing adsorption traps in alternating collection/regeneration cycles as shown in FIG. 3.

Figure 3:
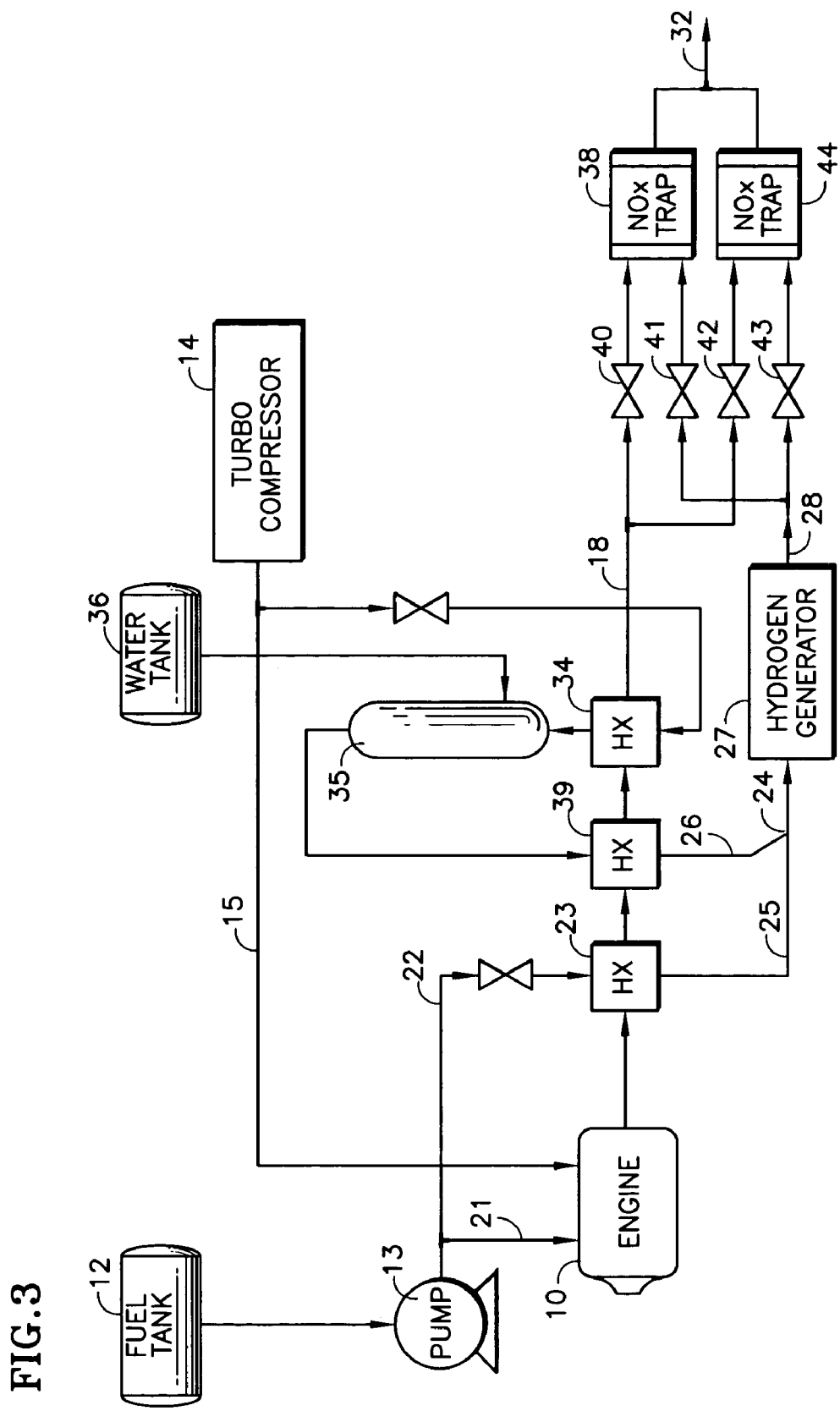
FIG. 3 is a simplified, stylized schematic illustration of an engine incorporating a second humidifying embodiment of the present invention.

Referring to FIG. 3, a pair of NOx adsorbent traps 38, 44 are alternatively connected by corresponding valves 40–43 to either the conduit 28 with hydrogen-containing gas from the generator 27, or to the pipe 18 containing engine exhaust. The valves are controlled so that engine exhaust is allowed to flow through one of the traps 38, 44 for a period of time which is less than the time necessary to saturate the adsorbent with NOx, and then the valves are switched so that exhaust flows through the other NOx trap, while the adsorbent in the first NOx trap is regenerated by the hydrogen and carbon monoxide from the generator 27. In one cycle, the valves 40, 43 will be open and the valves 41 and 42 will be closed; in the next cycle, the valves 41 and 42 will be open and the valves 40 and 43 will be closed, and so forth. The NOx traps may, for example, contain barium carbonate ($BaCO_3$) as the adsorbent: when the diesel exhaust is adsorbed by the barium carbonate, a reaction generates barium nitrate.

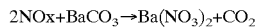

Then, during the regeneration cycle, the barium nitrate is converted back to barium carbonate, as follows.

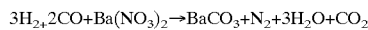

A CPOx oxidizer is preferred as the hydrogen generator 27 because it is very small and can run with low steam carbon ratios and high turndown ratios without soot or carbon formation. However, diesel engine exhaust contains particulates (soot) and oxides of sulfur (SOx), which may deactivate the CPOx catalyst in a relatively short period of time. Therefore, a non-catalytic (homogeneous) partial oxidizer may alternatively be selected as the hydrogen generator 27. The percentage of hydrogen produced is only slightly less than that produced by a CPOx. It is easily started by employing a simple spark plug, as is known. Additionally, POX is cheaper than CPOx; control of the $O_2/C$ ratio is known (similar to engine $O_2$/fuel ratio), and simpler; SOx and soot do not affect it; and there is no steam/C ratio control problem.

Figure 4:
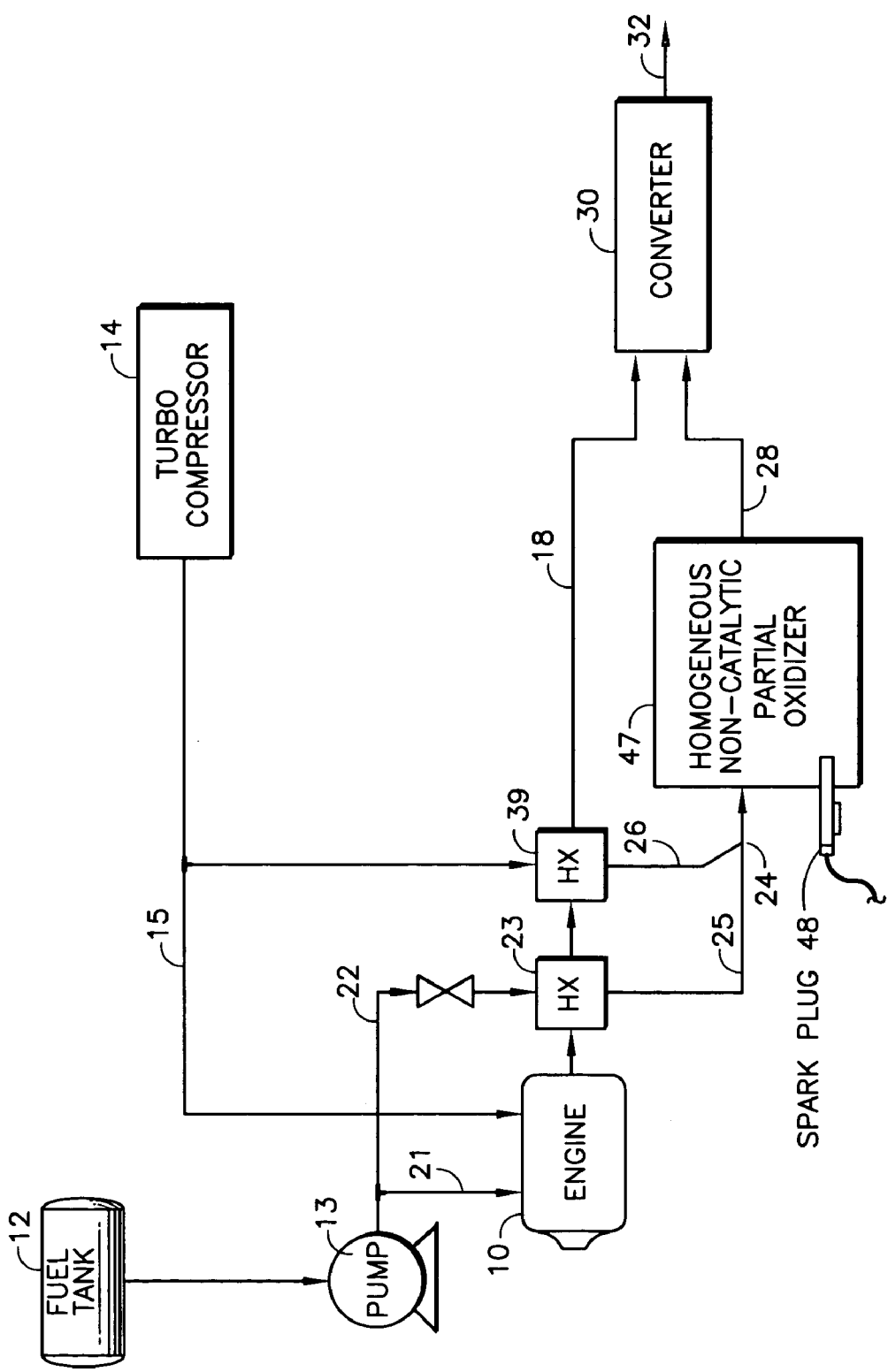
FIG. 4 is a simplified, stylized schematic illustration of an engine incorporating a first non-humidifying embodiment of the present invention.

Because the POx has a spark plug to initiate the reaction, it may be utilized with a mixture of ambient air without further humidification, defined herein as "unhumidified air" and fuel, to generate hydrogen and carbon monoxide, according to a second aspect of the invention. Referring to FIG. 4, air in the air inlet line 15 from the turbocompressor 14 is passed through the heat exchanger 39, over the line 26 and mixed with heated fuel at the mixer 24. This is at the inlet to a homogeneous, non-catalytic partial oxidizer 47 which includes a spark plug 48. The POx 47 provides reformate in the line 28 to the converter 30 in the same fashion as described with respect to FIG. 2.

Figure 5:
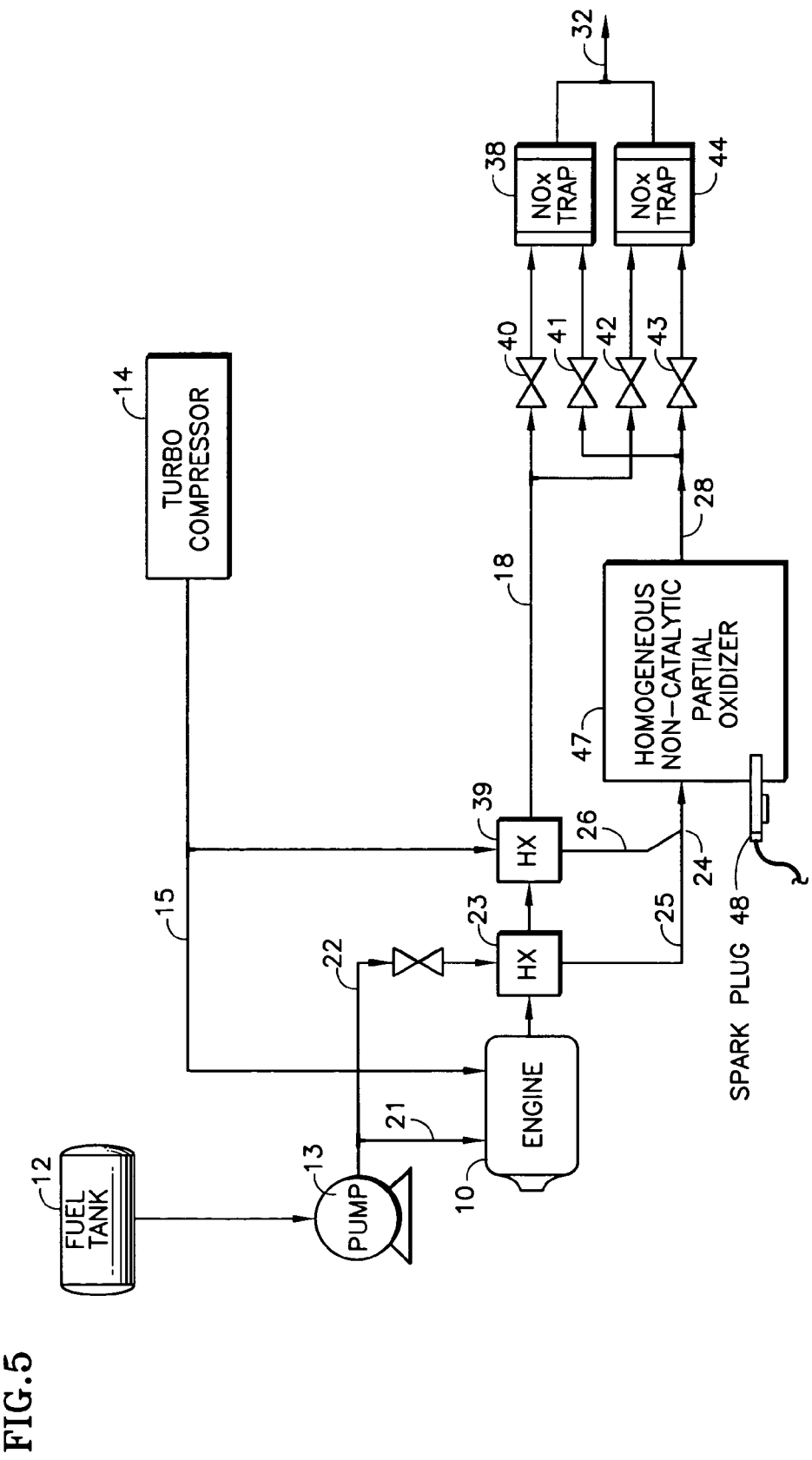
FIG. 5 is a simplified, stylized schematic illustration of an engine incorporating a second non-humidifying embodiment of the present invention.

In this later aspect of the invention, the homogeneous non-catalytic partial oxidizer 47 may be used to provide hydrogen for regeneration of the NOx trap adsorbent, as is illustrated in FIG. 5.

The embodiments herein heat the fuel before it is utilized for hydrogen generation. However, it is not necessary for the fuel to be heated whenever a homogenous, non-catalytic partial oxidizer is employed, since the spark plug thereof will start the process at any temperature.

The embodiments herein heat the air before it enters the bubbler. However, the air exiting the turbo compressor is hot, typically around 212° F. (100° C.)–390° F. (200° C.), so the heat exchanger 34 may be omitted if desired. Since the spark plug in the POx 47 can start a reaction at any temperature, the heat exchangers 23 and 39 of FIGS. 4 and 5 may be omitted, if desired. If necessary, the water could be preheated, preferably by exhaust, which could be allowed to bubble through the water tank 36 or which could be fed to a heat exchanger; but an electric heater could be used instead if desired.

In the embodiments of FIGS. 2 and 3, the water storage tank 36 is separate from the air bubbler 35; however, if desired to save components and space, the water may be stored in the bubbler which then also comprises the storage tank, and the tank 36 may be omitted. The invention may be practiced using other humidifiers, such as evaporative plate humidifiers, misters, or others; in such a case, water must be stored on board the vehicle in some form of suitable tank. If more $H_2$ is needed in the converter 30 or the traps 38, 44, a small water-gas-shift converter may be used between the hydrogen generator and the converter or traps. This would use water from the tank to convert only some of the CO to $H_2$.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

I claim:

1. A method of diminishing oxides of nitrogen (NOx) in the exhaust of a system including a hydrocarbon-fueled engine that provides engine exhaust containing NOx, said method comprising:

generating reformate from a mixture of air humidified by an air bubbling humidifier receiving water from a tank of water and engine fuel, to provide a flow of reformate including hydrogen and carbon monoxide; and using the flow of reformate for reducing NOx in said engine exhaust to provide system exhaust with diminished NOx.

2. A method according to claim 1 wherein:
said generating step comprises reforming a mixture containing vaporized fuel.

3. A method according to claim 1 wherein:
said generating step comprises vaporizing fuel by heat exchange with said exhaust.

4. A method according to claim 1 wherein:
said generating step comprises humidifying air in an air bubbling humidifier which serves as said tank for said water.

5. A method according to claim 1 wherein:
said step of reducing NOx comprises applying said exhaust and said flow, contemporaneously, to a NOx reducing catalytic converter.

6. A system according to claim 1 wherein:
said step of reducing NOx comprises alternately applying said engine exhaust and said flow to at least one NOx trap, separately.

7. A system using reformate for reducing oxides of nitrogen (NOx) in the exhaust of a hydrocarbon-fueled, internal combustion engine which operates with fuel from a source and air from an air inlet and which provides engine exhaust in an exhaust pipe, comprising:
reformate means having an inlet and an outlet for providing at said outlet a flow of said reformate including at least hydrogen, said means comprising a hydrogen generator and a tank of water, said hydrogen generator receiving, at an inlet of said hydrogen generator, fuel from said source and a mixture comprising air from said air inlet humidified by an air bubbler which humidifies air with moisture from said tank; and NOx reducing means receiving said engine exhaust and said reformate for reducing the NOx in said engine exhaust to provide system exhaust with diminished NOx.

8. A system according to claim 7 wherein said output of said reducing means comprises no more than about 0.4 grams/bhp/hr NOx.

9. A system according to claim 7 wherein said output of said reducing means comprises no more than about 0.28 grams/bhp/hr of non-methane hydrocarbons.

10. A system according to claim 7 further comprising:
a heat exchanger for vaporizing engine fuel before said fuel is added into said mixture.

11. A system according to claim 7 wherein said air bubbler is separate from said tank.

12. A system according to claim 7 further comprising:
a heat exchanger receiving humidified air out of said air bubbler to heat the humidified air with hot engine exhaust.

13. A system according to claim 7 wherein said NOx reducing means comprises at least one NOx trap, each NOx trap alternately trapping NOx in said exhaust and being regenerated by said outflow of reformate.

14. A system according to claim 7 wherein said NOx reducing means comprises an NOx reducing catalytic converter.

15. A system according to claim 7 wherein said hydrogen generator is selected from an auto-thermal reformer, a catalytic partial oxidizer and a homogeneous non-catalytic partial oxidizer.

* * * * *